United States Patent [19]

Raab

[11] Patent Number: 4,698,135

[45] Date of Patent: Oct. 6, 1987

[54] DESALINATING DRIP-IRRIGATION SYSTEM

[75] Inventor: Simon Raab, Lorraine, Canada

[73] Assignee: Sirdan Research Limited, Lorraine, Canada

[21] Appl. No.: 783,332

[22] Filed: Oct. 3, 1985

Related U.S. Application Data

[63] Continuation of Ser. No. 465,654, Feb. 10, 1983, abandoned.

[51] Int. Cl.$^4$ .............................................. C02F 1/14
[52] U.S. Cl. .................................... 202/234; 202/187; 202/188; 202/237; 203/10; 203/DIG. 1; 203/DIG. 17; 159/903; 159/DIG. 27; 159/DIG. 28
[58] Field of Search .............. 202/188, 187, 237, 234; 203/DIG. 1, 10, DIG. 17; 159/903, DIG. 28, DIG. 27, DIG. 23; 47/48.5, 79

[56] References Cited

U.S. PATENT DOCUMENTS

| | | | |
|---|---|---|---|
| 2,807,912 | 10/1957 | Bjorksten | 159/903 |
| 3,240,683 | 3/1966 | Rodgers | 159/DIG. 27 |
| 3,337,418 | 8/1967 | Halacy, Jr. | 47/48.5 |
| 3,436,315 | 4/1969 | Ackerman | 203/DIG. 1 |
| 3,497,423 | 2/1970 | Rodgers | 159/DIG. 28 |
| 3,528,251 | 9/1970 | Falk | 47/48.5 |
| 3,578,071 | 5/1971 | Johnston | 202/236 |
| 3,587,730 | 6/1971 | Milton | 159/DIG. 28 |
| 3,785,931 | 1/1974 | Coffey et al. | 159/903 |
| 3,801,284 | 4/1974 | Meckler | 202/234 |
| 4,075,063 | 2/1978 | Tsay et al. | 202/234 |
| 4,107,000 | 8/1978 | Currin | 203/DIG. 1 |
| 4,209,363 | 6/1980 | Ramer | 203/DIG. 1 |
| 4,265,713 | 5/1981 | Cheng | 159/DIG. 27 |
| 4,344,824 | 8/1982 | Soleau, Jr. | 202/234 |

OTHER PUBLICATIONS

Sheth et al, *Desalination of Sea Water Using Solar Radiation Under Retarded Evaporation Conditions;* Ind. Eng. Chem., Process Dev. vol. 14, No. 4, 1975, pp. 351-358.

*Primary Examiner*—S. Leon Bashore
*Assistant Examiner*—V. Manoharan
*Attorney, Agent, or Firm*—Schwartz, Jeffery, Schwaab, Mack, Blumenthal & Evans

[57] ABSTRACT

A system is provided for use adjacent a plant supporting material to be irrigated, for converting salt water into fresh water and dispensing the fresh water dripwise to the plant supporting material. The system comprises an evaporator member made of microporous hydrophobic material and having first and second surfaces, the microporous hydrophobic material permitting water vapor to diffuse through the member between the first and second surfaces thereof while preventing liquid water from passing therethrough, and a condenser including a condensing surface is spaced from the second surface of the evaporator member to define a gap therebetween. The condensing surface is in liquid flow communication with the plant supporting material to be irrigated. A conduit is provided for conducting a flow of salt water along the first surface of the evaporator members.

8 Claims, 9 Drawing Figures

DESALINATING DRIP-IRRIGATION SYSTEM

This application is a continuation of application Ser. No. 465,654, filed Feb. 10, 1983, abandoned.

BACKGROUND OF THE INVENTION

The present invention relates to a desalinating drip-irrigation system for producing low cost irrigation water for agriculture starting from brakish well water or sea water. More particularly, the invention is directed to a system for use adjacent a plant supporting material to be irrigated, for converting salt water into fresh water dispensing the fresh water thus produced dripwise to the plant supporting material.

Desalination or the conversion of salt water into fresh water has been the subject of extensive research for many years. In particular, solar desalination has been of great interest in this age of high energy costs. Solar desalination is however characterized by low yields of fresh water and normally requires large surface areas and significant capital expense. However, operating costs are minimized since the energy of the sun is used as heating energy and is thus free, and only moderate maintenance is required.

Agricultural development in the arid areas where solar desalination has been of interest has benefited tremendously over the last few years from development of a technique called drip-irrigation. Drip-irrigation is characterized by huge decreases in water consumption for a given crop with actual increases in productivity for other biological reasons. As the name suggests, irrigation is performed using drips at ground level rather than by overhead spraying. This minimizes evaporation and run-off losses and results in a small but adequate amount of water percolating down to the roots of the plants to be irrigated. The percolation does not occlude air and hence results in improved plant performance. Typical water quantities used are on the order of 2 liters per meter of crops per day; however, overhead spraying may use 100 times this amount of water and provides lower plant performance.

In a typical solar still installation, salt water contained in a black trough covered with a sloping glass roof is heated by the sun and vaporizes slowly. The water vapor reaches the cooler glass surface by convection where it condenses, forming a film of distilled water which runs off into a collecting trough and from there to storage. Another form of solar still which is described in U.S. Pat. No. 3,785,931 comprises a vertical microporous evaporator tube housed within, but separated from, a transparent condenser tube. Salt water absorbed by the porous evaporator is heated by sunlight passing through the transparent condenser to produce water vapor which subsequently condenses on the inner surface of the condenser. As condensed water collects on the condenser tube, it runs down to be collected as purified water. The condensate, however, is not used for irrigation purposes.

U.S. Pat. No. 2,807,912, on the other hand, discloses a pelagic solar still for producing fresh water from sea water and for irrigating plants on the surface of the ocean with the fresh water thus produced. This pelagic solar still comprises a receptacle adapted to float on the surface of the ocean and containing at the bottom thereof a bed of plant supporting material such as sand or soil. The receptable is covered with a transparent glass or plastic sheet, beneath which is a wick extending over the receptable and down into the sea water, the portion of the wick underlying the transparent sheet being on the interior of the receptable. Sea water carried by the wick to the area immediately below the transparent sheet is heated by solar radiation passing through the sheet, and the resulting water vapor condenses on the underside of an inwardly and upwardly extending portion of the receptable. The condensate runs down to the bottom of the receptable and collects as fresh water which serves to irrigate plants. Such a solar still is thus essentially limited to supporting plant growth on the surface of the ocean and cannot of course be used on land for drip-irrigation.

SUMMARY OF THE INVENTION

It is therefore an object of this invention to provide a desalinating drip-irrigation system for producing low cost irrigation water starting from salt water.

It is another object of the invention to amalgamate the relative inefficiency of solar desalination with the inherently small water requirements of drip irrigation so as to permit the direct pumping of salt water into field crops and the irrigation of the latter with fresh water.

In accordance with the present invention, there is thus provided a desalinating drip-irrigation system for use adjacent a plant supporting material to be irrigated, for converting salt water into fresh water and dispensing the fresh water dripwise to the plant supporting material, which system comprises an evaporator member made of microporous hydrophobic material and having first and second surfaces, the microporous hydrophobic material permitting water vapor to diffuse through the member between the first and second surfaces thereof while preventing liquid water from passing therethrough, and condenser means including a condensing surface spaced from the second surface of the evaporator member to define a gap therebetween, the condensing surface being in liquid flow communication with the plant supporting material to be irrigated. Means are provided for conducting a flow of salt water along the first surface of the evaporator member, as well as means for generating a temperature gradient between the first surface of the evaporator member and the condensing surface. The temperature gradient is such as to cause evaporation of the salt water at the first surface and diffusion of the resulting water vapor through the evaporator member from the first surface to the second surface thereof and across the gap so as to condense on the condensing surface and to thereby form condensed fresh water which is allowed to drip off the condensing surface to be absorbed by the plant supporting material.

The evaporator member used according to the invention for evaporating the salt water is made of a material which is hydrophobic, microporous and permeable to gases, including water vapor. The term hydrophobic, as used herein, means that liquid water will not spread on the material and wick its porous structure. In other words, a drop of water placed on the surface of a hydrophobic material will remain in the form of a nearly spherical bead with an advancing water contact angle exceeding 90° C. The material is also porous and contains very small pores that resist the entry of liquid water, but readily allow the flow of gases, such as water vapor. Unlike wicking materials which are inherently hydrophilic and transport water by capillary action, the porous hydrophobic material used in accordance with the invention allows water vapor to diffuse therethrough when a temperature gradient is generated across the material such that the water vapor will flow from a zone of relatively high water vapor pressure of the warmer side to a zone of lower water vapor pressure at the cooler side.

Examples of suitable microporous hydrophobic materials for use as salt water evaporator include microporous polyethylene sold under the trademark DARAMIC and microporous, expanded polytetrafluoroethylene sold under the trademark GORETEX, as well as microporous, expanded polypropylene. These materials generally have pores with a size of about 0.01 to about 0.2μ. Another suitable microporous hydrophobic material is one sold under the trademark CELGARD, by Celanese Plastics Co. The Thickness of the evaporator member, that is, the distance between the first and second surfaces thereof, is generally in the range of about 0.001 to about 0.05 inch.

The temperature gradient which must be established between the first surface of the evaporator member and the condensing surface can be generated in a number of ways. Assuming an ambient air temperature of 30° C. and humidity of 20%, which may be considered typical of arid regions, temperatures either above or below this must be generated in order for the evaporation/condensation process to take place. It has been found in practice that a difference in temperature of about 5° C. will be sufficient, although greater temperature gradients are usually attained.

According to a preferred embodiment of the invention, the necessary temperature gradient is generated by cooling the condensing surface while maintaining the first surface of the evaporator member at ambient temperature by conducting salt water at such temperature therealong. The condensing surface can be advantageously cooled by using solar radiation or ambient heat (i.e. hot dry air) to cause evaporative cooling of a liquid contained in a cooling chamber immediately adjacent the condensing surface, and hence cooling of the condensing surface.

According to another preferred embodiment, the temperature gradient is generated by using solar radiation to heat the salt water conducted along the first surface of the evaporator member, while maintaining the condensing surface at ambient temperature.

According to still a further preferred embodiment of the invention, both the above solar heating and evaporative cooling techniques are combined so as to generate greater temperature gradients.

The desalinating drip-irrigator of the invention is capable of transporting salt water to field crops, absorbing solar energy and/or ambient heat along the way and simultaneously desalinating the water, resulting in small amounts of fresh water which are allowed to drip out in a uniform manner for irrigation.

The system of the invention is of course not limited to drip-irrigation, and can also be used sub-surface of a plant supporting material to be irrigated, adjacent the roots of plants.

The present invention therefore provides, in another aspect thereof, a desalinating irrigation system for use sub-surface of a plant supporting material to be irrigated, for converting salt water into fresh water and dispensing the fresh water to the plant supporting material, which system comprises an evaporator tube made of microporous hydrophobic material and having inner and outer surfaces with the outer surface adapted to directly contact the plant supporting material, the microporous hydrophobic material permitting water vapor to diffuse through the tube between the inner and outer surfaces thereof while preventing liquid water from passing therethrough. Means are provided for conducting a flow of salt water along the inner surface of the evaporator tube, as well as means for generating a temperature gradient between the inner and outer surfaces of the evaporator tube. The temperature gradient is such as to cause evaporation of the salt water at the inner surface and diffusion of the resulting water vapor through the evaporator tube from the inner surface to the outer surface thereof. The plant supporting material adjacent the outer surface of the evaporator tube serves as a condensing medium to permit the water vapor emanating from the outer surface to condense and thereby from condensed fresh water which is allowed to seep into the plant supporting material for irrigation thereof.

The system of the invention can also be used for other purposes. For example, it may be positioned on the roof of a building and serve to simply convert salt water into fresh water for use as drinking water or for other household requirements.

Accordingly, the invention provides in a further aspect thereof a desalinating system for converting salt water into fresh water, comprising an evaporator member made of microporous hydrophobic material and having first and second surfaces, the microporous hydrophobic material permitting water vapor to diffuse through the member between the first and second surfaces thereof while preventing liquid water from passing therethrough, and condensor means including a condensing surface spaced from the second surface of the evaporator member to define a gap therebetween. Inlet means are provided for conducting a flow of salt water along the first surface of the evaporator member, as well as means for generating a temperature gradient between the first surface of the evaporator member and the condensing surface. The temperature gradient is such as to cause evaporatin of th salt water at the first surface and diffusion of the resulting water vapor through the evaporator member from the first surface to the second surface thereof and accross the gap so as to condense on the condensing surface and to thereby form condensed fresh water. Outlet means are also provided for discharging the condensed fresh water thus produced.

BRIEF DESCRIPTION OF THE DRAWINGS

Further features and advantages of the invention will become apparent from the following description of preferred embodiments thereof as illustrated by way of examples in the accompanying drawings, wherein.

DESCRIPTION OF PREFERRRED EMBODIMENTS

Figure 1:
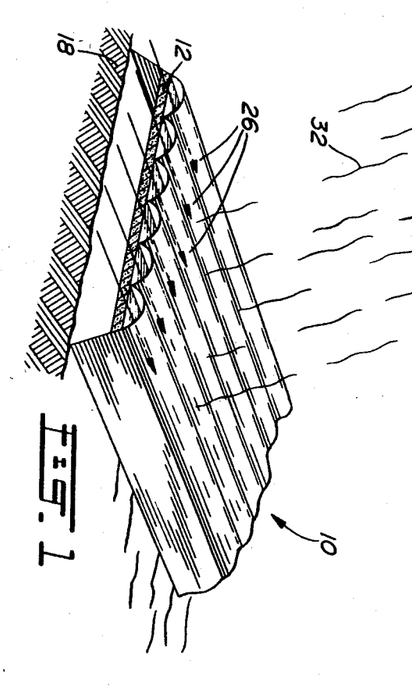
FIG. 1 is a sectional perspective view of a desalinating drip-irrigator according to a first preferred embodiment of the invention.
Figure 2:
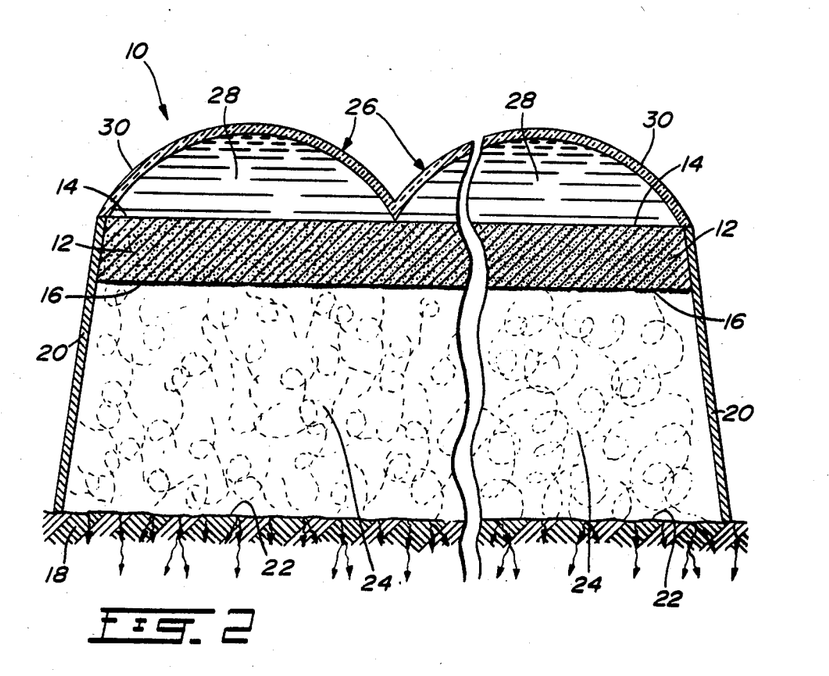
FIG. 2 is a cross-sectional view of the desalinating drip-irrigator illustrated in FIG. 1.

Referring first to FIGS. 1 and 2, there is illustrated a desalinating drip-irrigator generally designated by reference numeral 10 and based on solar desalination, that is, the use of solar energy as heating energy for evaporating salt water and converting it into fresh water. The desalinating drip-irrigator 10 comprises an elongated evaporator plate 12 made of microporous hydrophobic material and having parallel opposed surfaces 14 and 16. The evaporator plate 12 is supported above the plant supporting material 18 to be irrigated which may be sand or soil, by means of a pair of depending skirts 20 connected to side edges of the plate such that the plate surface 16 faces an exposed surface 22 of the plant supporting material and the skirts 20 enclose the gap 24 defined between the surfaces 16 and 22.

The evaporator plate 12 is provided thereon with a plurality of elongated ducts 26 joined side-by-side and extending parallel to each other along the plate surface 14. Each duct 26 is of convex cross-section and engages the surface 14 to define a channel 28 for guiding the salt water to be desalinated onto a portion of the surface 14 underlying a duct, the salt water feed through the ducts 26 having a common flow direction as shown by the arrows in FIG. 1. The ducts 26 are made of solar radiation absorbent material and each have an outer surface 30 exposable to solar radiation, which is black for maximum retention of solar energy.

Upon exposure to solar radiation, the sun's rays 32 are absorbed by the ducts 26 which serve to heat the salt water contained therein, which in turn heats the plate surface 14. The heated salt water thus causes a temperature gradient to be generated between the warmer surface 14 of the evaporator plate 12 and the cooler surface 16 thereof as well as the cooler surface 22 of the plant supporting material, which surfaces 16 and 22 are at ambient temperature. As a result, the salt water evaporates at the plate surface 14 and the resulting water vapor diffuses through the plate 12 from the surface 14 to the surface 16 thereof and across the gap 24 so as to ultimately condense on the surface 22 of the plant supporting material, which thus serves as condensing surface. The condensed fresh water is rapidly absorbed, by capillary action, into the plant supporting material as shown by the arrows in FIG. 2. Since the gap 24 is enclosed by the skirts 20, there is minimum re-evaporation of the condensed water and hence a further minimization of the water requirements for irrigation.

Ordinarily, the heat transfer to the plant supporting material 18 would result in a rise in temperature of the material and a slowing of the evaporation/condensation process. This effect, however, is minimized since the heat of condensation is drawn from the condensing surface 22 as the fresh water is drawn downward by capillary action, allowing the process to continue.

Figures 3, 4, 5:
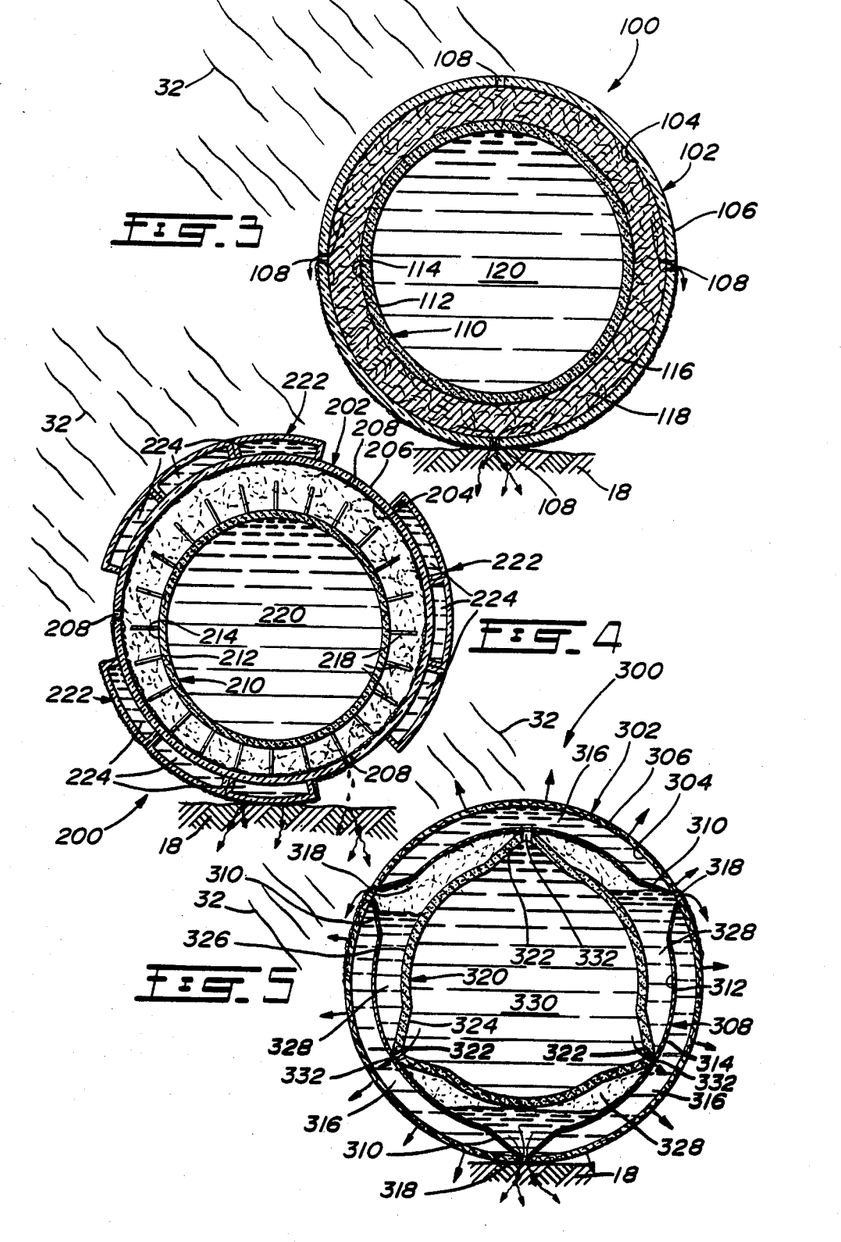
FIGS. 3, 4 and 5 are cross-sectional views of other desalinating drip-irrigators according to second, third and fourth preferred embodiments of the invention, respectively.

The embodiments illustrated in FIGS. 3 and 4 are also based on solar heating of the salt water with ambient temperature condensation.

The desalinating drip-irrigator 100 shown in FIG. 3 comprises a transparent condenser tube 102 of circular cross-section which is supported on the plant supporting material 18 to be irrigated. The condenser tube 102 has an inner surface 104 serving as condensing surface and an outer surface 106 with a major portion exposable to solar radiation. Spaced-apart drip-holes 108 are disposed circumferentially about the tube 102 to provide liquid flow communication between the inner surface 104 thereof and the plant supporting material 18 and to thus permit dispensing of the condensed fresh water thereto.

An evaporator tube 110 of circular cross-section is arranged coaxially within the condenser tube 102. The tube 110 is made of microporous hydrophobic material and has inner and outer surfaces 112 and 114, the outer surface 114 being spaced from the inner surface 104 of the condenser tube 102 to define a gap 116 across which water vapor emanating from the surface 114 diffuses to condense on the surface 104. The evaporator tube 110 is maintained in spaced relation to the condenser tube 102 by means of a wick material 118 filling the gap 116 while permitting water vapor to pass therethrough. The interior of the evaporator tube 110 serves as a channel 120 for guiding the salt water to be desalinated along the inner surface 112 thereof.

Thus, upon exposure to solar radiation, the sun's rays 32 pass through the transparent condenser tube 102 and impinge upon the evaporator tube 110, thereby heating the salt water in the channel 120 and generating the necessary temperature gradient between the inner surface 112 of the evaporator tube 110 and the inner surface 104 of the condenser tube 102, which is maintained at ambient temperature. The water vapor resulting from the evaporation of the salt water at the inner surface 112 of the evaporator tube 110 diffuses through the tube 110 from the inner surface 112 to the outer surface 114 thereof and across the gap 166 through the wick material 118 contained therein, to ultimately condense on the inner surface 104 of the condenser tube 102. The condensed fresh water is allowed to drip off the condensing surface via the drip-holes 108 so as to be absorbed by the plant supporting material 18, as shown by the arrows in FIG. 3.

Assuming an ambient temperature of 30° C., the salt water contained in the evaporator tube 110 would have to be at a temperature of about 40° C. for daytime operation. However, the sun is capable of only limited heating of the water and it would be advantageous to pre-heat the salt water prior to entering the evaporator tube. This can be accomplished using the embodiment represented in FIG. 4, in order to pre-heat the salt water to about 35° C. before ultimately being boosted by the sun's energy to an operating temperature of about 40° C. The evaporation/condensation process then occurs with a temperature difference of about 5° C., although this difference will usually be greater under most operating conditions.

The desalinating drip-irrigator 200 shown in FIG. 4 operates essentially upon the same principle as the desalinating drip-irrigator 100 of FIG. 3, that is, solar heating of the salt water contained in the evaporator tube and ambient temperature condensation.

The desalinating drip-irrigator 200 comprises a transparent condenser tube 202 of circular cross-section which has an inner surface 204 serving as condensing surface and an outer surface 206, with drip-holes 208 providing liquid flow communication between the inner surface 204 and the plant supporting material 18, so as to permit dispensing of the condensed fresh water thereto. An evaporator tube 210 also of circular cross-section is arranged coaxially within the condenser tube 202. The tube 210 is made of microporous hydrophobic material and has inner and outer surfaces 212 and 214, the outer surface 214 being spaced from the inner surface 204 of the condenser tube 202 to define a gap 216 across which water vapor emanating from the surface 214 diffuses to condense on the surface 204, similarly as in the embodiment of FIG. 3. The evaporator tube 210, however, is maintained in spaced relation to the condenser tube 202 by means of a plurality of spaced-apart ribs 218 extending radially outwardly from the tube 210 and arranged circumferentially thereabout, a number of which abut a lower inner surface portion of the condenser tube 202 in a non sealig manner to permit condensed fresh water to seep therebetween. The interior of the evaporator tube 210 serves as a channel 200 for guiding the salt water to be desalinated along the inner surface 212 thereof.

In order to cool the condenser tube 202 as well as to preheat the salt water prior to entering the evaporator tube 210, the condenser tube 202 is provided with three transparent elongated ducts 222 equispaced circumferentially thereabout, with the drip-holes 208 interposed between the ducts 222. Each duct 222 extends longitudinally along an outer surface portion of the condenser tube 202 and defines three salt water channels 224 in liquid flow communication with the evaporator tube 210. The salt water in the channels 224 is thus preheated by absorption of the heat of condensation, which also cools the condenser tube 202 by such heat exchange.

The walls of the ducts 222 and condenser tube 202 are transparent in order to permit the sun's rays 32 to pass therethrough and to impinge upon the evaporator tube 210, so as to heat the salt water in the tube 210 in excess of the ambient temperature without heating the water in the ducts 222 or the wall of the condenser tube 202, thereby generating the necessary temperature gradient. The outer surface 214 of the evaporator tube 210 is black for maximum retention of solar energy.

In order to achieve a better temperature gradient with the desalinating drip-irrigators 100 and 200 represented in FIGS. 3 and 4, the condenser tube can have a circumference relative to the evaporator tube which is sufficiently large to provide a wider gap between the outer surface of the evaporator tube and the inner surface of the condenser tube. This wider gap provides further thermal insulation between such surfaces, which results in increased salt water temperature inside the evaporator tube and higher performance. The inner surface of the condenser tube is preferably treated with a wetting agent in order to prevent dropwise condensation which inhibits the transmission of sunlight.

The ambient temperature condensation approach is particularly advantageous when the desalinating drip-irrigator is operated at night. It is characteristic of arid desert-like regions that significant temperature drops occur at night. Since the ambient nighttime temperature is lower that the ambient daytime temperature, salt water which has warmed to the daytime ambient temperature may be passed at night through the evaporator tube and since the condenser tube is being cooled by the cooler night air the evaporation/condensation process will take place. However, the salt water flow will have to be higher than during daytime operation since no heat input is occurring.

An alternate approach to the ambient temperature condensation is the evaporative cooling technique. Hot dry air can be used for cooling, as in a cooling tower, where water is exposed to this air resulting in evaporation and hence cooling of the water. At equilibrium, this can result in a water temperature of 18° C. in an ambient air at 30° C. with a relative humidity of 20%. This water can thus be used for cooling a condenser surface. This technique is only limited by the rate of cooling of the evaporating water.

Figures 6, 7, 8, 9:
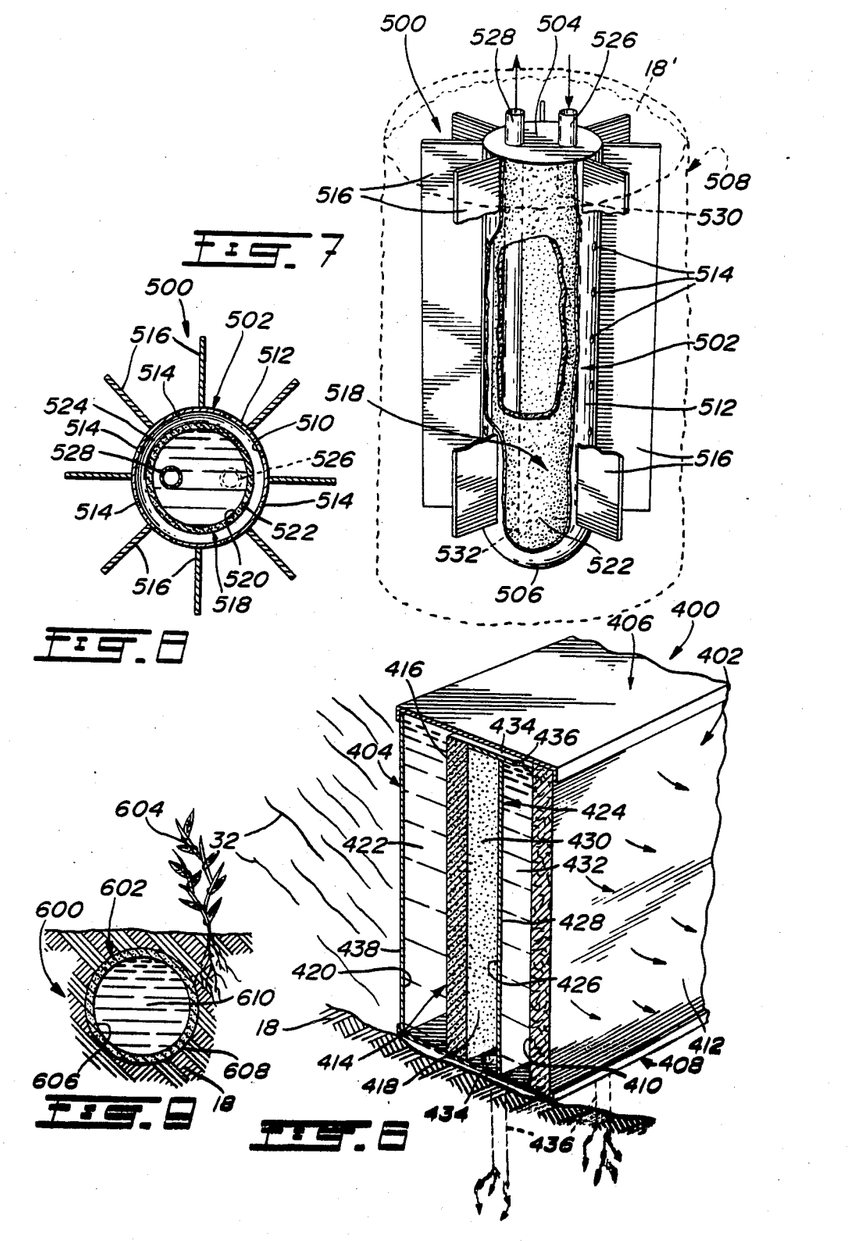
FIG. 6 is a sectional perspective view of another desalinating drip-irrigator according to a fifth preferred embodiment of the invention.
FIG. 7 is a perspective view of still another desalinating drip-irrigator according to a sixth preferred embodiment of the invention, shown partially cut away to illustrate hidden features thereof.
FIG. 8 is a cross-sectional view of the desalinating drip-irrigator of FIG. 7.
FIG. 9 is a cross-sectional view of a desalinating irrigator according to a further preferred embodiment of the invention.

The embodiment represented in FIGS. 5 and 6 incorporate such evaporative cooling technique.

As shown in FIG. 5, the desalinating drip-irrigator 300 comprises an evaporator cooling tube 302 of circular cross-section which is supported on the plant supporting material 18 to be irrigated. The tube 302 is made of microporous hydrophobic material and has an inner surface 304 and an outer surface 306 with a major portion exposable to solar radiation. A condenser tube 308 of generally cylindrical cross-section is arranged coaxially within the evaporator cooling tube 302 and is formed with three spaced-apart outwardly extending protrusions 310 disposed circumferentially about the tube 308, each protrusion 310 engaging at the apex thereof the inner surface 304 of the evaporator cooling tube 302 for supporting the condenser tube 308 within the evaporator cooling tube 302. The tube 308 has an inner surface 312 with a major portion serving as condensing surface and an outer surface 314 with a major portion spaced from the inner surface 304 of the evaporator cooling tube 302 so as to form a cooling chamber 316 between two successive protrusions 310, for containing a liquid such as salt water to be subjected to evaporative cooling. Each protrusion 310 has at the apex thereof drip-holes 318 which extend through the evaporator cooling tube 302 and are disposed longitudinally of the tube 302 in spaced relation to each other, so as to provide liquid flow communication between the inner surface 312 of the condenser tube 308 and the plant supporting material 18 and to thus permit dispensing of the condensed fresh water thereto.

An evaporator tube 320 of generally cylindrical cross-section is arranged coaxially within the condenser tube 308 and is also formed with three spaced-apart outwardly extending protrusions 322 disposed circumferentially about the tube 320, each protrusion 322 engaging at the apex thereof the inner surface 312 of the condenser tube 308 intermediate the protrusions 310 thereof for supporting the evaporator tube 320 within the condenser tube 308. The tube 320 is made of microporous hydrophobic material and has inner and outer surfaces 324 and 326, the outer surface 326 being spaced from the inner surface 312 of the condenser tube 308 to define a gap 328 between two successive protrusions 322, across which water vapor emanating from the surface 326 diffuses to condense on the surface 312. The interior of the evaporator tube 320 serves as a channel 330 for guiding the salt water to be desalinated along the inner surface 324 thereof. Each protrusion 322 of the evaporator tube 320 has at the apex thereof openings 332 extending through the condenser tube 308 for supplying salt water from the channel 330 to the cooling chamber 316 and subjecting it to evaporative cooling. Excess ions which build up in the cooling chamber 316 as a result of the evaporation of the salt water contained therein diffuse back to the salt water channel 330 via the openings 332.

The sun's rays 32 impinging upon the evaporator cooling tube 302 as well as ambient hot dry air cause evaporative cooling of the salt water contained in the chamber 316, resulting in efficient cooling of the inner surface 312 of the condenser tube 308 below ambient temperature. The inner surface 324 of the evaporator tube 320, on the other hand, is maintained at ambient temperature by conducting salt water at such temperature therealong, and the necessary temperature gradient between the inner surface 324 of the evaporator tube 320 and the inner surface 312 of the condenser tube 308 is thus generated. The water vapor resulting from the evaporation of the salt water at the inner surface 324 of the evaporator tube 320 diffuses through the tube 320 from the inner surface 324 to the outer surface 326 thereof and across the gaps 328 to condense on the inner surface 312 of the condenser tube 308. Since the drip-holes 318 have the dimensions of pin-holes, the condensed fresh water accumulates in the gaps 328 to eventually completely fill up the latter. As the condensate in the gaps 328 is also cooled as a result of the evaporative cooling taking place in the chambers 316, it then serves as a condensing medium into which water vapor emanating from the surface 326 of the evaporator tube 320 may further condense. The condensed fresh water is forced out through the drip-holes 318 by hydrostatic pressure, so as to be ultimately absorbed by the plant supporting material 18.

The desalinating drip-irrigator 400 shown FIG. 6 is in the form of an elongated horizontally extending housing which is supported on the plant supporting material 18 to be irrigated. An evaporator cooling plate 402 constitutes a first sidewall of the housing which has a second sidewall 404 opposite the first sidewall 402 with top and bottom walls 406 and 408 interconnecting the sidewalls 402 and 404. The evaporator cooling plate 402 is made of microporous hydrophobic material and has inner and outer surfaces 410 and 412, a major portion of the outer surface 412 being exposable to solar radiation or ambient hot dry air. An upstanding evaporator plate 414 also made of microporous hydrophobic material is disposed within the housing and has parallel opposed surfaces 416 and 418. The surface 416 of the plate 414 is spaced from the inner surface 420 of the sidewall 404 to define a channel 422 therebetween, which serves to conduct the salt water to be desalinated along the surface 416 of the evaporator plate 414.

An upstanding condenser plate 424 is arranged within the housing intermediate the evaporator plate 414 and the evaporator cooling plate 402 and has parallel opposed surfaces 426 and 428. The surface 426 serves as condensing surface and is spaced from the surface 418 of the evaporator plate 414 to define a gap 430 across which water vapor emanating from the surface 418 diffuses to condense on the surface 426. The surface 428, on the other hand, is spaced from the inner surface 410 of the evaporator cooling plate 402 so as to form a cooling chamber 432 for containing salt water to be subjected to evaporative cooling. The salt water is supplied to the chamber 432 from the salt water channel 422 via the channel 434 and holes 436 provided adjacent the top wall 406. Excess ions which build up in the cooling chamber 432 as a result of the evaporation of the salt water contained therein diffuse back to the salt water channel 422.

The bottom wall 408 is provided with drip-holes 434 disposed between the evaporator plate 414 and the condenser plate 424, so as to provide liquid flow communication between the condensing surface 426 and the plant supporting material 18 and to thus permit dispensing of the condensed fresh water thereto. The bottom wall 408 is also provided with a plurality of support tubes 436 extending downwardly therefrom and communicating with the drip-holes 434. The support tubes 436 are adapted to penetrate into the plant supporting material 18 to a depth sufficient to secure the desalinating drip-irrigator 400 in an upright position with the bottom wall 408 thereof abutting the plant supporting material, while permitting condensed fresh water dispensed from the drip-holes 434 to pass through the tubes 436 and to seep into the plant supporting material 18.

The sidewall 404 is made of solar radiation absorbent material and has an outer surface 438, a major portion of which is exposable to solar radiation and is black for maximum retention of solar energy. Thus, when the desalinating drip-irrigator 400 is used and the major outer surface portion of the sidewall 404 is exposed to the sun's rays 32 while the major outer surface portion of the evaporator cooling plate 402 constituting the outer sidewall is exposed to ambient hot dry air, the sun's rays 32 impinging upon the sidewall 404 as well as ambient hot dry air cause the salt water in the channel 422 to increase in temperature. On the other hand, the hot dry air to which the evaporator cooling plate 402 is exposed causes evaporative cooling of the salt water contained in the chamber 432, resulting in cooling of the condensing surface 426 of the condenser plate 424. The necessary temperature gradient between the surface 416 of the evaporator plate 414 and the condensing surface 426 is thereby generated, causing the evaporation/condensation process to take place.

Different types of plant cultivation require different irrigation approaches. In the larger ornamental plant market, most cultivation is performed in containers. Currently, individual drippers are used when using drip-irrigation. The desalinating drip-irrigator 500 illustrated in FIGS. 7 and 8 is especially adapted for drip-irrigation of containerised plant supporting material.

As shown, the desalinating drip-irrigator 500 comprises a condenser tube 502 of circular cross-section having a predetermined length with both ends 504 and 506 thereof closed, so as to form a probe adapted to penetrate into the plant supporting material 18' inside a container 508. The condenser tube 502 is made of a thermally conducting material such as aluminum, and has inner and outer surfaces 510 and 512. The surface 510 serves as condensing surface whereas the surface 512 is adapted to directly contact the plant supporting material 18' so as to cause cooling of the inner surface 510 of the condenser tube 502. Spaced-apart drip-holes 514 are arranged circumferentially about the condenser tube 502 to provide liquid flow communication between the inner surface 510 thereof and the plant supporting material 18' and to thus permit direct seepage of the condensed fresh water thereinto. In order to assist in cooling the inner surface 510 of the condenser tube 502, a plurality of spaced-apart cooling fins 516 are arranged circumferentially about the tube 502, with the drip-holes 514 interposed therebetween. The cooling fins 516 extend radially outwardly from the condenser tube 502 and directly into the plant supporting material 18'.

An evaporator tube 518 of circular cross-section with closed ends is arranged coaxially within the condenser tube 502. The tube 518 is made of microporous hydrophobic material and has inner and outer surfaces 520 and 522, the outer surface 522 being spaced from the inner surface 510 of the condenser tube 502 to define a gap 524 across which water vapor emanating from the surface 522 diffuses to condense on the surface 510. A pair of inlet and outlet tubes 526 and 528 extend through the end 504 of the condenser tube 502 and into the evaporator tube 518 for circulating the salt water to be desalinated along the inner surface 520 of the tube 518. The salt water in the tubes 526 and 528 is heated by field exposure to the sun. The temperature gradient which is thus generated between the inner surface 520 of the evaporator tube 518 and the inner surface 510 of the condenser tube 502 causes the evaporation/condensation process to take place. The cooling fins 516 conduct the heat of condensation away from outer surface 512 of the condenser tube 502 and assist in maintaining the temperature gradient required for the process to continue.

In order to permit flushing of the evaporator tube 518, the inlet tube 526 has its free end 530 disposed within the tube 518 adjacent the end 504 whereas the outlet tube 528 has its free end 532 disposed within the tube 518 adjacent the other end 506.

Conventionally, fertilization is also performed through the drippers used for drip-irrigation. In the embodiment represented in FIG. 7, the evaporator tube 518 can be flushed with air and filled with fresh water containing liquid fertilizers. The system can be pressurized above its normal operating pressure, so as to force the liquid fertilizer through the tubes 518 and 502 and into the plant supporting material 18'.

Turning finally to FIG. 9, there is illustrated a desalinating irrigator generally designated by reference numeral 600 and shown embedded in the plant supporting material 18 to be irrigated. The desalinating irrigator 600 comprises an evaporator tube 602 of circular cross-section arranged below the surface of the plant supporting material adjacent the roots of plants 604. The tube 602 is made of microporous hydrophobic material and has inner and outer surfaces 606 and 608. The interior of the evaporator tube serves as a channel 610 for guiding the salt water to be desalinated along the inner surface 606 thereof.

By circulating salt water which has previously been heated, for example by field exposure to the sun, along the inner surface 606 of the evaporator tube 602, a temperature gradient is generated between the inner surface 606 and the outer surface 608 which is in direct contact with the plant supporting material 18 and is thus maintained at a cooler temperature. This temperature gradient causes the salt water to evaporate at the inner surface 606 and the resulting water vapor to diffuse through the tube 602 from the inner surface 606 to the outer surface 608 thereof. The plant supporting material adjacent the outer surface 608 serves as a condensing medium to permit the water vapor emanating from the surface 608 to condense and thereby form condensed fresh water which is allowed to seep into the plant supporting material 18 for irrigation thereof.

As is apparent, the present invention enables one to produce low cost irrigation water for agriculture starting from salt water.

I claim:

1. A desalinating drip-irrigation system for use adjacent a plant supporting material to be irrigated, for converting salt water into fresh water and dispensing said fresh water dripwise to said plant supporting material, said system comprising:

an evaporator member consisting of a microporous hydrophobic material and having first and second surfaces, said microporous hydrophobic material permitting water vapor to diffuse through said member between said first and second surfaces thereof while preventing liquid water from passing therethrough;

a condenser member having a condensing surface spaced from said second surface of said evaporator member to define a gap therebetween, said condensing surface being in liquid flow communication with said plant supporting material to be irrigated;

means for conducting a flow of salt water along said first surface of said evaporator member; and means for generating a temperature gradient between said first surface of said evaporator member and said condensing surface, said temperature gradient generating means including an evaporator cooling member forming with said condenser member a cooling chamber for containing a cooling liquid, said evaporator cooling member consisting of said microporous hydrophobic material and causing evaporative cooling of said liquid on exposure of said evaporator cooling member to dry ambient air, thereby cooling said condensing surface and generating a temperature gradient which causes evaporation of said salt water at said first surface and diffusion of the resulting water vapor through said evaporator member from said first surface to said second surface thereof and across said gap so as to condense on said condensing surface and to thereby form condensed fresh water which is allowed to drip off said condensing surface to be absorbed by said plant supporting material.

2. A desalinating drip-irrigation system as claimed in claim 1, wherein said microporous hydrophobic material is microporous polyethylene.

3. A desalinating drip-irrigation system as claimed in claim 1, wherein said microporous hydrophobic material is selected from the group consisting of microporous, expanded polytetrafluoroethylene and polypropylene.

4. A desalinating drip-irrigation system as claimed in claim 1, wherein said microporous hydrophobic material has pores with a size of about 0.01 to about $0.2\mu$.

5. A desalinating drip-irrigation system as claimed in claim 1, wherein said evaporator cooling member is a hollow evaporator cooling tube supported by said plant supporting material, said evaporator cooling tube having an inner surface and an outer surface exposable to said dry ambient air; said condenser member is a hollow condenser tube arranged coaxially within said evaporator cooling tube and formed with a plurality of spaced-apart outwardly extending protrusions disposed circumferentially about said condenser tube and each having an apex engaging said inner surface of said evaporator cooling tube for supporting said condenser tube within said evaporator cooling tube, said condenser tube having an inner surface face constituting said condensing surface and an outer surface spaced from said inner surface of said evaporator cooling tube with said cooling chamber defined therebetween, each said protrusion having at the apex thereof drip-holes extending through said evaporator cooling tube for providing said liquid flow communication between said inner surface of said condenser tube and said plant supporting material; and wherein said evaporator member is a hollow evaporator tube having inner and outer surfaces constituting respectively said first and second surfaces and also defining an inner channel constituting said salt water conducting means, said evaporator tube being arranged coaxially within said condenser tube and formed with a plurality of spaced-apart outwardly extending protrusions disposed circumferentially about said evaporator tube and each having an apex engaging said inner surface of said condenser tube intermediate said protrusions of said condenser tube for supporting said evaporator tube within said condenser tube, each protrusion of said evaporator tube having at the apex thereof openings extending through said condenser tube for providing a feed of salt water from said channel of said evaporator tube to said cooling chamber, whereby exposure of said outer surface of said evaporator cooling tube to said dry ambient air causes evaporative cooling of the salt water contained in said cooling chamber, thereby cooling said inner surface of said condenser tube and generating said temperature gradient.

6. A desalinating drip-irrigation system as claimed in claim 1, wherein said evaporator cooling member is an evaporator cooling plate constituting a first sidewall of a housing having a second sidewall opposite said first sidewall with top and bottom walls interconnecting said first and second sidewalls, each of said sidewalls having inner and outer surfaces and said bottom wall being supported by said plant supporting material to be irrigated; said evaporator member is an evaporator plate arranged within said housing and upstanding from said bottom wall thereof, said evaporator plate having parallel opposed surfaces constituting said first and second surfaces with said first surface spaced from said inner surface of said second sidewall to define a salt water channel therebetween, said channel constituting said salt water conducting means; said condenser member is a condenser plate arranged within said housing intermediate said evaporator plate and said first sidewall and upstanding from said bottom wall, said condenser plate having parallel opposed surfaces, one of which constitutes said condensing surface and the other is spaced from said inner surface of said first sidewall with said cooling chamber formed therebetween; and wherein said bottom wall is provided with drip-holes disposed between said evaporator plate and said condenser plate for providing said liquid flow communication between said condensing surface of said condenser plate and said plant supporting material, and said evaporator cooling plate constituting said first sidewall has an outer surface exposable to said dry ambient air, whereby exposure of said outer surface of said evaporator cooling plate to said dry ambient air causes evaporative cooling of said liquid contained in said cooling chamber, thereby cooling said condensing surface of said condenser plate and generating said temperature gradient.

7. A desalinating drip-irrigation system as claimed in claim 6, wherein said second sidewall is made of solar radiation absorbent material and has an outer surface exposable to solar radiation and wherein said salt water channel is in liquid flow communication with said cooling chamber for providing a feed of salt water thereto and subjecting same to evaporative cooling, whereby solar radiation impinging upon said outer surface of said second sidewall with said outer surface of said evaporator cooling plate exposed to said dry ambient air causes said salt water contained in said channel to increase in temperature, thereby increasing said temperature gradient.

8. A desalinating drip-irrigation system as claimed in claim 7, wherein said outer surface of said second sidewall is black for maximum retention of solar energy.

* * * * *